May 24, 1927.
H. C. KELLY
1,630,186
COMBINATION KNIFE FOR PEELING ORANGES
Filed July 9, 1925
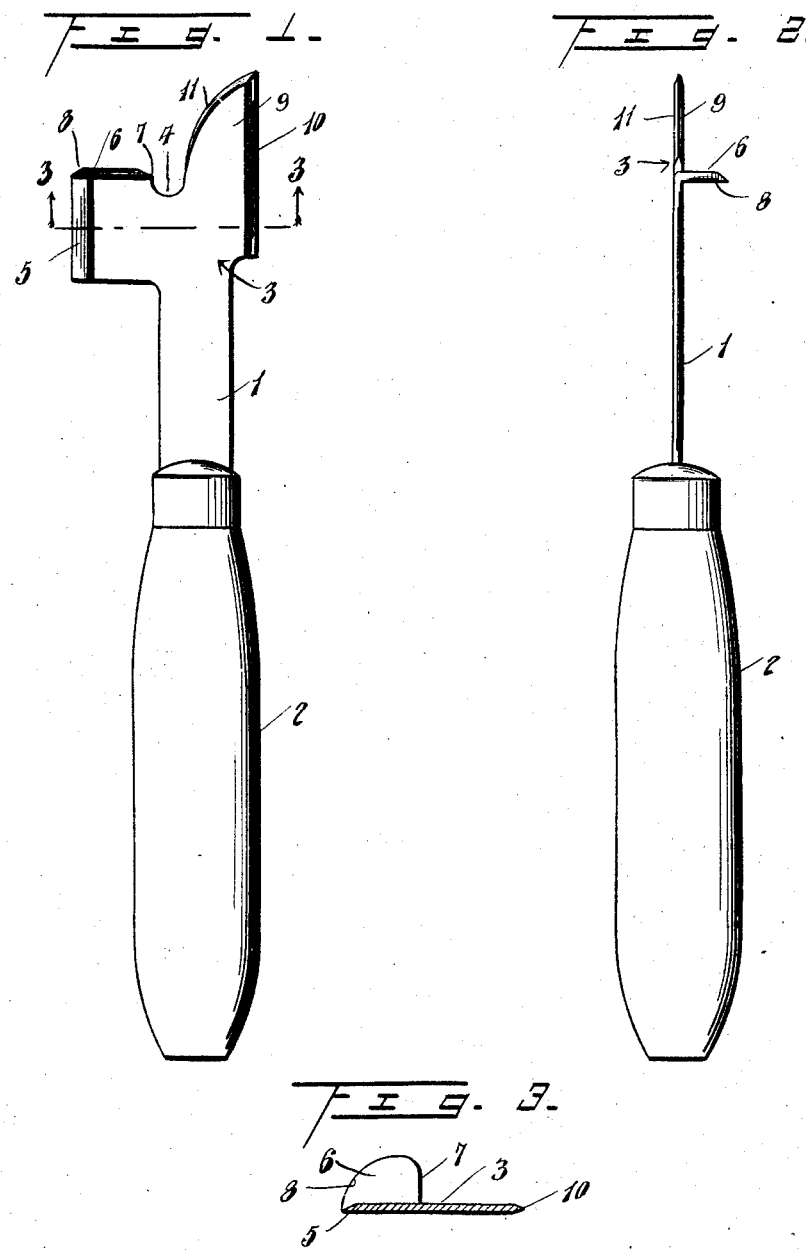
Inventor
Hanson C. Kelly.

Patented May 24, 1927.

1,630,186

UNITED STATES PATENT OFFICE.

HANSON C. KELLY, OF WEST BURLINGTON, IOWA.

COMBINATION KNIFE FOR PEELING ORANGES.

Application filed July 9, 1925. Serial No. 42,492.

The invention relates to a device particularly designed for removing the peelings from oranges and has for its object the provision of a knife including a shank and a blade section at the outer end of the shank wider than the shank and having blades on the lateral edges of said wider portion with cutting edges substantially parallel to the shank, a blade at one side of the blade section being elongated and pointed and designed to cut out the stem end of the orange to provide an opening for insertion of the knife on the other side of the blade portion to remove the peeling; the knife on the other side of the blade section having its lateral edge sharpened and also having a blade extending perpendicularly to the base of the blade section from the outer edge of the blade section, said particular blade being formed with a curved portion, and an inner upright edge, the curved portion and the inner upright edge being sharpened, said perpendicular blade being adapted to be used for cutting incisions in the peeling to divide it into segments, the face of the blade section limiting the depth of cut of the perpendicular blade to prevent cutting the pulp of the orange, the blade on the same side of the blade section with the perpendicular blade being then used to strip the peeling from the pulp in segments.

The invention will be described in detail hereinafter and will be found illustrated in the accompanying drawings in which Figure 1 is a plan view of the improved knife for peeling oranges, Figure 2, an edge view, and Figure 3, a cross section on a plane indicated by the line 3—3 of Figure 1.

In the drawings similar reference characters will be used to designate corresponding parts throughout the several views.

The improved knife for peeling oranges comprises a shank 1 adapted to be secured to a handle 2, and having a blade section 3 on its outer end that is wider than the shank. A notch 4 is formed on the outer edge of the blade section 3. At one side of the notch 4 an extended blade 5 is provided having its lateral edge sharpened, and 6 indicates a blade formed perpendicularly to the outer edge of the blade 5 and having the edge adjacent to the notch 4 formed substantially perpendicular to the base of the blade section 3 as shown at 7, and the remaining edge of the blade curves downwardly as shown at 8 and coinciding with the outer end of the blade 5, the edges 7 and 8 being sharpened as indicated in the drawings. On the other side of the notch 4 is formed a pointed blade 9 that extends forwardly of the plane of the blade 6 and has its outer lateral edge substantially parallel with the edge of the shank 1 sharpened to form a blade designated 10. The other edge of the blade is defined by curved lines indicated at 11 beginning at the notch 4 and curving outwardly and coinciding with the edge 10, said curved edge being sharpened as indicated in the drawing.

In use, the pointed blade 9 is first used to cut an opening in the stem end of the orange, a circular incision being made for this purpose. The orange peeling is then cut into segments by means of the blade 6, the face of the blade section 3 limiting the depth of the incision made by the blade 6 and the cuts made extend from the stem end of the orange to the bud end. The implement is then inverted and the peeling is removed in segments with the blade 5, the blade 6 following the incision theretofore made by the blade in stripping the peeling from the orange. In this way the peeling of the orange may be removed without cutting into the pulp of the orange and the removal of the peeling may be quickly effected.

What is claimed is:—

1. In an orange peeler, a cutting implement having a shank, a pointed blade forming an extension of said shank and arranged at one side thereof, said blade being sharpened on its two edges, a blade at the other side of the shank and extending laterally thereof, said blade being sharpened on its outer lateral edge, and another blade extended perpendicularly to the face of the second mentioned blade and curved in outline, said blade having its extended edges sharpened.

2. In an orange peeler, a cutting implement having a shank with parallel edges, a pointed blade forming an extension of said shank and arranged at one side thereof, said pointed blade having a straight sharpened edge substantially parallel with the edge of the shank, the opposite edge of said blade also sharpened and curved to meet the first mentioned edge, a blade at the outer side of the shank and extending laterally thereof, said blade having a straight sharpened edge substantially parallel with the edge of the shank, and another blade extended perpendicularly to the second mentioned blade from the forward edge thereof, the last mentioned blade having a straight inner edge and a curved edge extending therefrom and outwardly and inwardly to the second mentioned blade.

3. In an orange peeler, a shank, a blade section formed as an extension of and wider than the shank and having a notch in its outer edge, a blade on one side of the notch having its lateral edge sharpened, a blade formed as an extension of the first mentioned blade and extending perpendicularly to the face thereof on its outer edge, said last mentioned blade having its edges sharpened, and another blade on the other side of the notch from the before mentioned blades and extended outwardly thereof beyond said first mentioned blades, said last mentioned blade having its lateral edge sharpened, and having a curved sharpened edge extending from the notch and coinciding with the lateral sharpened edge.

HANSON C. KELLY.